INVENTORS
ADOLF FROHLICH &
EDWARD J. HARRIS

ATTORNEY

INVENTORS
ADOLF FRÖHLICH &
EDWARD J. HARRIS

2,848,740

APPARATUS FOR SHAPING AND VULCANIZING PNEUMATIC TIRES

Adolf Heinrich Frohlich, Hannover, Germany, and Edward J. Harris, Akron, Ohio, assignors to The Cleveland Trust Company, Cleveland, Ohio, as trustee Application October 3, 1955, Serial No. 538,225

8 Claims. (Cl. 18—17)

This invention relates to pneumatic tire manufacture, and in particular, relates to apparatus employed in shaping and vulcanizing pneumatic tires.

For several years past, the manufacture of pneumatic tires has been carried out by first building up a plurality of uncured fabric plies on a building drum, so as to form what is conventionally known as a "flat-built" tire. This flat-built tire of uncured stock is subsequently transferred to a vulcanizing press having a pneumatic former that is capable of being positioned interiorly of the flat-built tire, so as to shape and retain the uncured tire in toroidal form so that the same may be vulcanized into a finished product. After the period of vulcanization has transpired, the pneumatic former is deflated and withdrawn from the interior of the vulcanized tire for reuse in subsequent operation.

In the past several years, various types and forms of hydraulic and pneumatic formers have been invented for shaping the flat-built tires into their required toroidal shape during the period of vulcanization. These various types of formers have included air and steam operated formers, as well as formers that employ hot water and other hydraulic fluids as the vulcanizing medium. However, without exception, the inflating and deflating of these pneumatic formers has been timed to coincide with the opening and closing of the vulcanizing press, with the result that the pneumatic former could not, for example, be transferred from its position interiorly of the shaped tire during the time the press was closed.

As is well known in the prior art, the prime function and purpose of the pneumatic former during vulcanization is to urge the internal surface of the flat-built tire into complete and full registry with the complemental mold sections of the vulcanizing press. Accordingly, it has always been considered proper procedure to maintain the pneumatic former in its fully inflated condition during the entire period of vulcanization, to thus insure complete contact between the uncured tire and the complemental mold section of the vulcanizing press.

It has been discovered, however, that the pneumatic former need only be inflated for a fraction of what is now considered to be the normal vulcanizing period. Thus, while the present day practice dictates a vulcanizing period that ranges from thirty to forty minutes in duration, it has been found that as a practical matter, the function of a pneumatic former ceases after the first five to seven minutes of this vulcanizing period. This is true, in view of the fact that when the shaped tire has reached its initial "cure" or "set" the same will be retained in this position thereafter regardless of the presence or absence of the pneumatic former. Thus, for all practical purposes, it has been found that it is not necessary that the former be fully inflated after an initial period of vulcanization that operates to "set" the tire in its toroidal shape.

Additionally, it has been found that the presence of this pneumatic former, after this relatively short period of initial vulcanization, is in actuality, detrimental to the vulcanization process, because the steam supplied interiorly of the former must first be absorbed through the walls of the former before being introduced against the uncured tire to effectuate the vulcanization of the same. This absorption process in the wall of the pneumatic former accordingly increases the amount of time required for vulcanization, with the result that the overall length of the vulcanization period is unnecessarily long.

It has been additionally discovered that the vulcanization period can be materially reduced if the pneumatic former is removed from the interior of the shaped tire after an initial vulcanization period of a few minutes duration that operates to initially cure or set the tire in its final toroidal shape. It is manifest that such withdrawal of the pneumatic former as above described must occur with the vulcanizing press closed, for several reasons. First, the heat loss that would occur interiorly of the press if the same were open must be prevented; and secondly, the pressure must be maintained interiorly of the press to prevent blistering or buckling of the tire being cured. Additionally, once the mold sections were opened, it would be impossible to reclose the same, in view of the fact that the tire had been "stripped" from the design-imparting surfaces of the complemental cavity molds.

In co-pending application Serial No. 480,517, filed January 7, 1955, by Adolf Frohlich and Edward J. Harris, there is disclosed and claimed a vulcanizing apparatus, wherein a pneumatic former is selectively positioned and withdrawn with respect to the pneumatic tire casing that is in turn, being vulcanized interiorly of a closed vulcanizing press. Such positioning and removal of the pneumatic former occurs without opening the press, as is fully described in the above referred to application.

As an improvement to the subject matter of the above-captioned application, there was disclosed in co-pending application Serial No. 517,610, filed June 23, 1955, by Adolf Frohlich and Edward J. Harris, a similar type of vulcanizing apparatus that was characterized by the provision of means for dividing the internal chamber of the vulcanizing press into a pair of sub-chambers, one of which was annular in nature and presented interiorly of the shaped tire being cured; while the other was cylindrical in configuration to permit reception therein of the withdrawn former. The means utilized to effectuate this novel action involved the use of a seal-off plate that was axially shiftable of the mold sections so as to seal off the annular chamber from the cylindrical chamber at such time as the pneumatic former was withdrawn into the cylindrical chamber.

While the above improvement operated satisfactorily, it was found that the mounting of the axial end of the pneumatic former was such that when the same was turned inside out during the removal thereof, and when the seal-off plate contacted the withdrawn former, that there still remained a circular portion of the former that was exposed within the annular chamber, with the result that this exposed portion was subject to the deleterious effect of the vulcanizing medium when the same was subsequently supplied interiorly of the annular chamber for direct application against the internal wall of the preshaped tire. In tests performed, it was found that this exposed portion failed at an earlier time than the remaining portions of the pneumatic former, and it was accordingly concluded that this was due to the fact that the same was continually exposed to the effect of the vulcanizing steam.

Accordingly, it is a principal object of this invention to provide an improved type of vulcanizing press having a pneumatic former capable of being inserted and withdrawn with respect to the interior of a shaped tire positioned interiorly of a vulcanizing press, with such insertion and withdrawal occurring during the time that the press is closed.

It is a further object of this invention to provide a vulcanizing press having a pneumatic former that is capable of being inserted and withdrawn as above described, and being further characterized by the fact that said former, when withdrawn, is completely sealed off and isolated from the influence of the vulcanizing medium that is supplied against the internal wall of the tire to cure the same.

It is a still further object of this invention to provide an improved type of seal-off plate that is composed of a minimum number of component parts as a result of having the axial movement thereof automatically initiated by the entrance of said vulcanizing medium interiorly of said annular cavity.

These and other objects of the invention will become more apparent upon a reading of the following brief specification, considered and interpreted in the light of the accompanying drawings.

Figure 1:
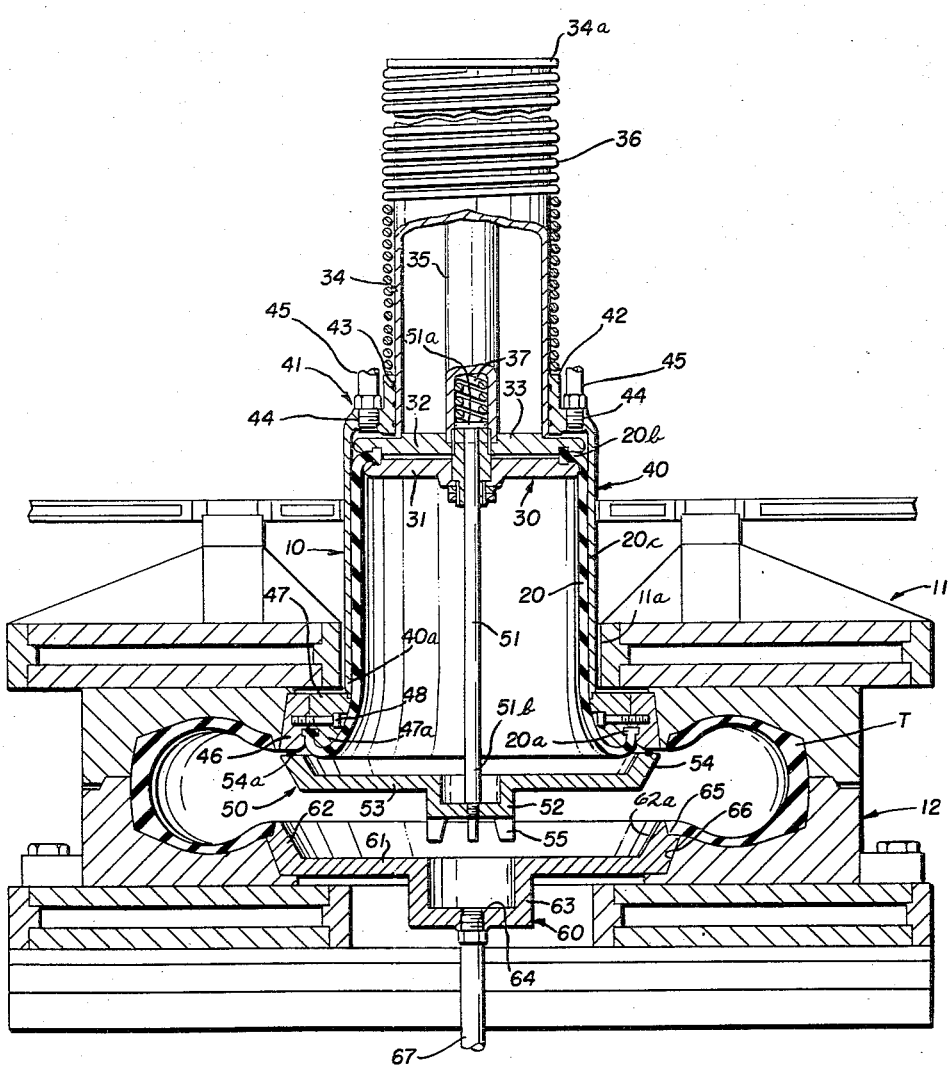
Figure 1 is a cross-sectional view partly broken away and in section and illustrating the pneumatic former being withdrawn from the interior of the shaped tire during the second stage of vulcanization.
Figure 2:
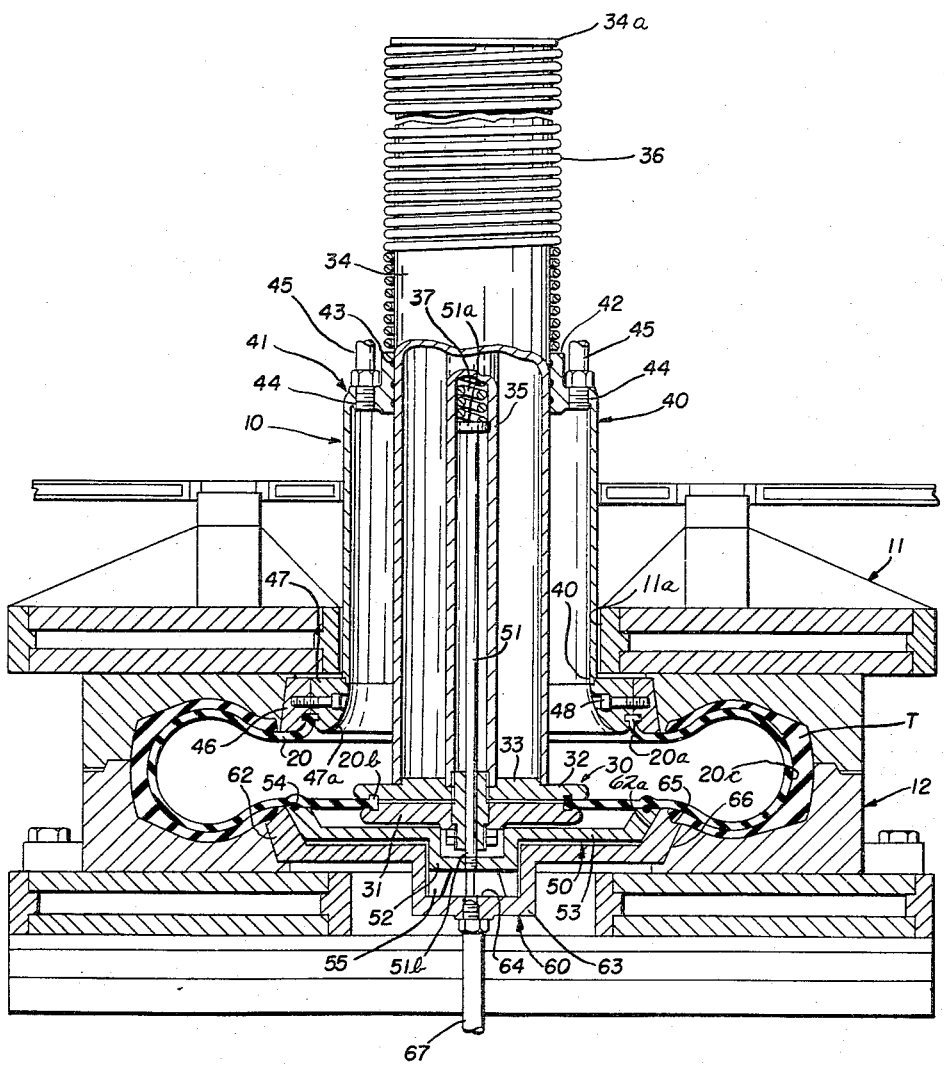
Figure 2 is a view similar to Figure 1, but illustrating the position of the component parts when the pneumatic former has been positioned interiorly of the shaped tire during the first stage of vulcanization.

Referring now to the drawings, and in particular to Figures 1 and 2 thereof, the improved pneumatic former, generally designated by the numeral 10, is shown carried by a relatively movable upper mold section 11 so as to be capable of insertion and withdrawal with respect to the annular mold cavity that is defined by upper mold section 11 and lower mold section 12 when the same are closed, as shown in the drawings.

In view of the fact that the vulcanizing press employed in connection with the improved pneumatic former of this invention is of standard construction, wherein a pair of complemental upper and lower mold sections are moved between open and closed positions, the detailed structure of the same is not illustrated in the drawings of this application; it being understood that any type and form of vulcanizing press utilizing relatively movable upper and lower mold sections would be satisfactory for use in this regard.

Description of the pneumatic former

The pneumatic former 10 is illustrated in the drawings as including a resilient tubular bladder 20 that has one beaded end 20a thereof fixed with respect to the upper mold section 11, while the axially opposed beaded end 20b thereof is secured to a disc plate 30; the arrangement being such that the disc plate 30 moves axially of a cylindrical housing 40 so as to permit the beaded end 20b to be positioned on opposed sides of the fixed end 20a as shown in the drawings.

In addition to the aforementioned component parts, a sealing plate 50 and a bead ejector mechanism 60 are provided for the respective purposes of isolating the pneumatic former 10 with respect to the vulcanizing medium and removing the finished or cured tire T from the mold when the vulcanizing operation has been completed.

Considering first the structure of the disc plate 30, it will be seen that the same includes a pair of abutted plates 31 and 32 that receive therebetween, adjacent the peripheral edge portions thereof, the beaded end 20b of bladder 20, the usual nuts or fastening devices (not shown) being employed to retain the plate 31 and 32 in their condition of abutment. The plate 32 is provided with a raised central portion 33 that serves as a seat for a pair of concentric tubular members 34 and 35, both of which are fixedly secured to member 32 with the tubular member 34 being surrounded by a spring 36 which seats against end 34a, while the latter (tubular member 35) accommodates a spring 37 that acts against one end 51a of a rod 51 for purposes to be described.

As best shown in the drawings, the cylindrical housing 40 has a closed end wall designated generally by the numeral 41, and which specifically includes a centrally projecting, apertured boss 42 within which the tubular member 34 may be slidingly received, with O-rings or other sealing devices 43, 43 being employed to effectuate a fluid-tight connection at this point. Additionally, the closed end 41 is also provided with apertures 44, 44 within which may be fitted, in known manner, the free ends of conduits 45, 45 that are provided for the purpose of supplying the interior of the housing 40 with pressurized fluid as will be presently described.

The opposite end 40a of housing 40 seats against a pair of axially abutted annular rings 46 and 47 that receive therebetween the beaded end 20a of bladder 20; the arrangement being such that screws 48, 48 retain the ring members 46 and 47 in the registered condition of the drawings so that the end 20a may be at all times fixed with respect to the upper mold section 11. Additionally, the ring 47 is shown provided with a radially contoured surface 47a, against which the inner wall 20c of bladder 20 may be received when the component parts are positioned as shown in Figure 2 of the drawings.

As previously indicated, the rod 51, together with the head end 51a thereof, is shiftable relatively of the tubular member 35 and the plate 30, and to this end the opposed end 51b of rod 51 is shown threaded into a circular extension 52 of plate 53, the latter having a flaring peripheral edge 54 that further includes an O-ring 54a that seats against bladder 20 when the component parts are positioned as shown in Figure 1 of the drawings. A spacer ring 55, projecting centrally of extension 52, operates to control the positioning of plate 53 with respect to the bead ejector mechanism 60 when the component parts are moved to the position of Figure 2.

Turning now to a consideration of the bead ejector mechanism 60, it will be seen that the same in essence includes an annular plate 61 appropriately provided with stepped concentric projections 62 and 63 that receive the complemental surfaces of plate 53 in seating relationship therewith with edge portion 54 seating against wall surface 62a, while projection 52 and ring 55 fit within projection 63 so as to seat against end wall 64 thereof (see Figure 2). For the purpose of receiving the beaded edge portion of the tire T, the outer peripheral edge portion of plate 61 defines a circular bead seat 65, together with a complementally tapered surface 66 that is received against the lower mold section 12 as shown in the drawings. The end wall 64 of projection 63 is shown apertured to receive the threaded end of a fluid conduit 67, and in this manner vulcanizing medium can be supplied to the interior of the annular cavity when the parts are disposed as shown in Figure 2 of the drawings.

It is to be understood at this point that while the bead ejector mechanism 60 also seats with respect to the lower mold section 12 as a result of the surface 66 seating against the appropriate undercut therefor, the entire bead ejector mechanism 60 is capable of being shifted axially away from mold section 12 by actuation of hydraulic means, for example (not shown), that act upon conduit 67 or other portions of plate 61 to cause such separating movement.

Operation of the device

In use or operation of the improved pneumatic former, it will first be assumed that the same has been positioned interiorly of a vulcanizing press that has had the upper mold section 11 thereof apertured as at 11a for reception thereof. It will further be assumed that the "flat-built," "green" tire T has been positioned so that the lower bead portion thereof is seated on seat 65 and that the bead ejector mechanism 60 has been axially spaced from the lower mold section 12 for this purpose. With the tire T thus positioned, the plate 61 may be moved towards the lower mold section 12 so that the surface 66 thereof seats against the appropriate circular undercut of lower mold section 12; and at this time, the mold section 11 may be relatively moved to effectuate a preliminary closing of the press that results in both axial ends of the uncured tire T being contacted by the closing press sections.

When the tire T is in this position, it is to be understood that the spring 37 will have forced the plate 53 downwardly so that the spacer ring 55 thereof is seated as shown, against end wall 64; although the bladder 20 will at this time, be retained within the housing 40 as a result of the force offered by the spring 36, which force operates to keep the disc plate 30 in the extended position similar to the location of the same as shown in Figure 1.

When it is desired to shape the tire T, it is merely necessary that pressurized fluid be introduced through conduits 45, 45 simultaneous with further closing action of the mold sections 11 and 12. This will cause the pressurized fluid to pass through apertures 44, 44 and act against the upper surface of plate 32 to thus cause a downward movement of plates 32, 31, together with tubular member 34; it being understood that such pressure will overcome the opposing force offered by the spring 36. As the disc plate 30 moves away from the closed end portion 41, the position of Figure 2 will be approached with spring 36 being tightly compressed at this time. During such movement it is apparent that the pressure inside of housing 40 will cause the bladder 20 to expand radially against the interior surface of tire T to thus shape the same.

When the position of Figure 2 is reached, it is apparent that the force offered by the pressurized fluid entering conduits 45, 45 will continuously force the surface 20c of bladder 20 against the internal wall of the shaped tire T as shown in Figure 2 of the drawings. The continuance of such pressure will accordingly shape the tire.

When the tire has been shaped as desired and a preliminary "set" has been effectuated as by the introduction of the vulcanizing medium through conduits 45, 45 for example, the bladder 20 may be withdrawn from the position of Figure 2 by merely terminating the source of supply of pressurized fluid to conduits 45, 45, which termination causes these conduits to act as exhaust ports. When such an exhaust has been created, as for example by opening a valve (not shown) in the line, the force of spring 36 will urge the disc 31 upwardly to the position of Figure 1.

While the spring 36 operates to move the disc 30 to the position of Figure 1, the action of the spring 37 is such that the same urges the plate 53 to retain the position of Figure 2 until such time as vulcanizing medium is introduced through conduit 67. When such vulcanizing medium is introduced, the same will act within ring 55 against the tubular extension 52 to raise the same against the force of the spring 37 so that the O-ring 54a thereof will contact the ring 46 so as to completely seal off bladder 20 within housing 40 as shown in Figure 1 of the drawings.

At this time the introduction of vulcanizing medium through conduit 67 may be continued until such time as the vulcanization cycle is completed, at which time the entrance of vulcanizing medium through conduit 67 may be terminated.

Upon such termination, the mold sections may be opened and the bead ejector mechanism 60 operated in known manner to cause the plate 61 to axially separate from the mold section 12 to thus position the cured tire at a point where the same may be easily removed.

At this time, a new "flat-built" tire may be inserted on the extended bead ring as previously described, and the above operation repeated for vulcanization of another tire.

Turning now to the modified form of the invention illustrated in Figure 3 of the drawings, the structure therein illustrated is identical in many respects to that previously described in connection with Figures 1 and 2 of the drawings; and accordingly, where indicated, like numerals designate like parts.

Accordingly, in this modified form of the invention, there is illustrated a resilient bladder 20 that is moved between a circular cavity 21 and an annular cavity 22, as a result of the axial shifting of a disc plate 70 axially of the housing 40.

The disc plate 70 is identical in structure to the previously described disc plate 30, with the single exception that the same (disc plate 70) is not centrally apertured for reception of any relatively movable parts as is the case in the construction of the disc plate 30. Accordingly, the disc plate 70 includes upper and lower plates 71 and 72, respectively, that are abutted together and retain therebetween the beaded end 20a of bladder 20 by the use of bolts 73, 73. The upper plate 71 seats a tubular member 74 that is retained with respect to the plate 71 by weld 75. Similarly, the lower plate 72 includes a central boss projection 76 as well as a tapered peripheral edge 76a that seats against a seal-off plate 80 as will be presently described. Surrounding the exterior surface of a tubular member 74 is a spring 77 that seats at one end against boss 42 of housing 40, while the other end thereof seats against flange 74a of tubular member 74 as shown in the drawings.

Turning now to the construction of the seal-off plate 80 per se, it will be seen that the same is of circular configuration and includes a series of stepped projections 81 and 82 that project axially of plate 83, as well as a peripheral edge 83a which seats against the bead ejector mechanism 60 in a similar manner to that previously described in connection with Figures 1 and 2 of the drawings, with spacer ring 85 limiting such movement. The plate 83 further includes a raised projection 83b of circular configuration, the purpose of such projection being to engage against an O-ring 84 that is provided in the annular ring member 47 that is attached to the upper mold section 11 as previously described.

As indicated above, the bead ejector mechanism 60 is substantially similar to that previously described in connection with Figures 1 and 2 of the drawings, and accordingly includes a projecting circular portion 62a that has an end wall 62b against which seats the spacer ring 85. In this manner, the seal-off plate 80 is always gravitationally urged into seating relationship with respect to the bead ejector mechanism 60.

For the purpose of unseating the bead ejector mechanism 60 the seal-off plate 80 includes a projecting stud 87 that is threaded as at 88, so that nut 89 can be adjusted thereon, it being understood that the free end of stud 87 connects with hydraulic piston 90 so that stud 87 can be axially shifted to cause lifting of plate 60 when nut 89 contacts the same.

Figure 3:
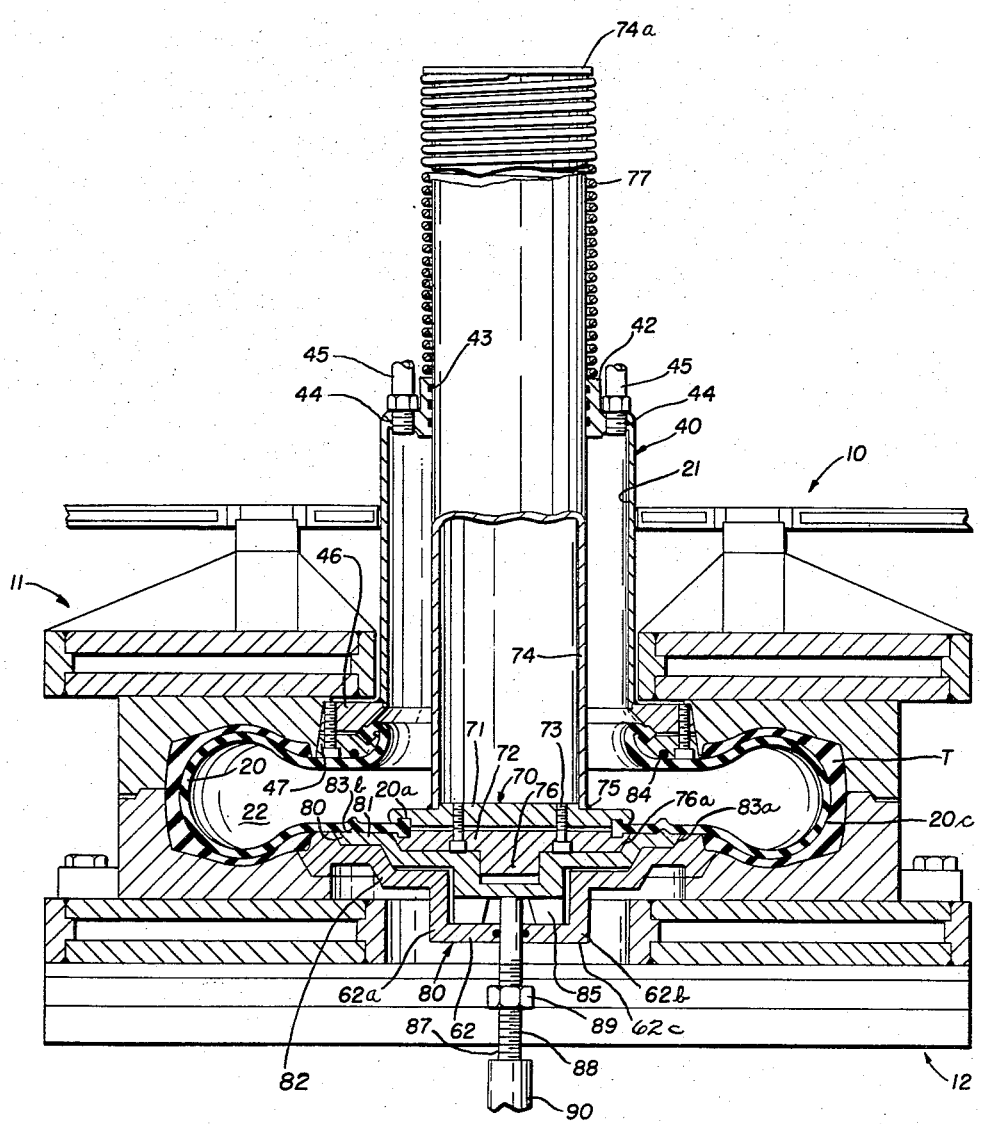
Figure 3 is a similar view, illustrating a modified form of the invention.

In use or operation of this modified form of the invention, the same will first be assumed to be in operation as shown in the full-line sketch of Figure 3 of the drawings, with the bladder 20 having the surface 20c thereof positioned against the internal wall of the tire T. At this time, pressurized fluid is entering through conduits 45, 45 to maintain the plate 72 against the seal-off plate 80 with surface 76a being complementally seated against the seal-off plate 80 for this purpose.

When it is desired to remove the bladder 20, it is merely necessary to discontinue the supply of pressurized fluid through conduits 45, 45, and at this time the force of the spring 77 will operate to axially shift the plate 70 and the shaft 74 upwardly so that the plate 70 is disposed adjacent the end wall 41 of housing 40 in a manner similar to that shown in Figure 1 of the drawings. During the time that the bladder 20 is being withdrawn, as just described, the nut 89 will contact surface 62c of end wall 62b and cause the mechanism 60 to be lifted so that the same will strip the tire T from lower mold 12.

It will be seen from the foregoing that there has been provided a new and novel type of vulcanizing press, characterized in each instance by the fact that the pneumatic former is isolated from the vulcanizing medium during the second stage of vulcanization, wherein the vulcanizing medium is directly applied against the internal wall of the "set" tire. It has been shown how the use of a pneumatic former of this nature permits the creation of a two-stage vulcanizing cycle, wherein a tire is given a preliminary shape by the former which is then withdrawn, while the press is closed, so that the second stage of direct vulcanization can be commenced. This two-stage method of vulcanization has been shown to materially reduce the amount of time involved in vulcanizing pneumatic tires.

In the above specification, specific reference has been made in certain portions, to exact types of configuration and composition. It is to be understood that such specific recitation is not intended in any way to limit the scope of this application.

It accordingly follows that modifications of the invention may be resorted to without departing from the spirit thereof or the scope of the appended claims.

This application is a continuation in part of co-pending applications Serial No. 480,517, and Serial No. 517,610, filed respectively on January 7, 1955, and June 23, 1955.

What is claimed is:

1. A vulcanizing press of the character described, comprising; a pair of complemental relatively movable mold sections having opposed bead seat areas and defining an annular curing chamber when closed; an inflatable former carried by one said mold section; a cylindrical housing carried by said mold section carrying said former and being disposed within the radial confines of said bead seat area thereof in concentricity therewith; means for moving said former between a position in said chamber and a position in said housing during the period said press is closed; seal-off means shiftable into and out of engagement with said bead seat area of said mold section carrying said former when said former is positioned within said housing whereby said housing is sealed off from said chamber; and means for supplying vulcanizing medium to said chamber during the period said seal-off means are in engagement with said bead seat area.

2. A vulcanizing press of the character described, comprising; a pair of complemental relatively movable mold sections having opposed bead seat areas and defining an annular curing chamber when closed; an inflatable former carried by one said mold section; a cylindrical housing carried by said mold section carrying said former and being disposed within the radial confines of said bead seat area thereof in concentricity therewith; means for moving said former between a position in said chamber and a position in said housing during the period said press is closed; a shaft concentrically positioned interiorally of said housing in axially shiftable relationship from one end of said former in axially shiftable relationship therewith; a cylindrical plate secured to the projecting end of said shaft and being substantially equal in diameter to said bead seat area, whereby said plate will engage said bead seat area upon axial shifting of said shaft when said former is positioned within said housing; and means for supplying vulcanizing medium to said chamber during the period said plate is in engagement with said bead seat area.

3. The device of claim 2 further characterized by the presence of a resilient sealing ring carried by said plate and being engageable with said bead seat area upon shifting of said shaft.

4. The device of claim 2 further characterized by the presence of a resilient sealing ring carried by said bead seat area and being engageable with said plate upon shifting of said shaft.

5. The device of claim 4 further characterized by the presence of means for supplying vulcanizing medium interiorally of said former when the same is positioned in said chamber and said press is closed.

6. The device of claim 2 further characterized by the presence of means for supplying vulcanizing medium interiorally of said former when the same is positioned in said chamber and said press is closed.

7. The device of claim 1 further characterized by the fact that said bead seat area is beveled in the region of juncture with said housing.

8. The device of claim 1 further characterized by the fact that the former is normally urged to a position within said housing.

References Cited in the file of this patent
UNITED STATES PATENTS 2,730,763   Brundage _____ Jan. 17, 1956